United States Patent Office 3,140,180
Patented July 7, 1964

3,140,180
HEAT DEVELOPABLE DIAZOTYPE REPRODUCTION COATINGS COMPRISING THERMOLABILE CARBOXYLIC TERTIARY ALKYL ESTERS
Gerhard Fritz, Wiesbaden, Germany, assignor, by mesne assignments, to Keuffel & Esser Co., Hoboken, N.J.
No Drawing. Filed Apr. 22, 1960, Ser. No. 23,887
Claims priority, application Germany Apr. 29, 1959
12 Claims. (Cl. 96—75)

The present invention relates to reproduction of documents by the diazo method and more particularly to a method of developing diazo type materials by the use of a heat decomposable material.

For the preparation of prints by the diazotype process two methods are practiced, that known as the dry process and that known as the semi-wet process. In the dry process, the material contains both the diazo compound and the azo component in the coating and, once having been exposed to light under a master, is developed with gaseous ammonia.

In the semi-wet process the azo component is applied either in acid or in alkaline solution after the material containing the diazo compound has been exposed to light under a master. The corresponding azo dyestuff is then formed in the unexposed parts. The disadvantages in the commonly practiced methods of diazo print development are, on the one hand, the troublesomeness of the odor arising from the ammonia used in the dry process, and, on the other, the outlay involved in the semi-wet process, not least from the point of view of apparatus, because of the use of a further bath for the azo component. Consequently, in the early days after the introduction of the diazotype process into industry efforts were directed towards a simpler development process in which the dyestuff formation might be brought about by the action of steam or heat. Coatings designed for this end have, for example, been prepared in which the stabilizers used are acids which are decarboxylated under the influence of heat. Unfortunately the shelf-life of such previously known coatings was unsatisfactory.

An object of the present invention is to provide a diazo type material and development process in which the coupling component is included in the diazo type coating and overcomes the objections of the prior known dry process and semi-wet processes.

Another object is to provide a diazo coupling material which is relatively stable under storage conditions and which is responsive to heat to free the coupling component whereby the diazo type coated material may be developed by the application of heat.

Briefly the present invention in heat developable diazo type reproduction coatings contain in addition to the diazo compounds at least one thermolabile ester of tertiary alcohols with carboxylic acids capable, although possibly not until after decarboxylation, of coupling.

Esters of tertiary alcohols decompose under the influence of heat—and particularly readily in the presence of catalysts—into olefines and free carboxylic acids in accordance with the following formula, a tertiary butyl ester having been in this case selected as example.

$$RCOOC(CH_3)_3 \rightarrow RCOOH + CH_2=C(CH_3)_2$$

In the present invention the carboxylic acid components of tertiary esters are those that are capable of coupling or at least possess a readily detachable carboxyl group and give a component capable of coupling after decarboxylation. Thus the carboxylic acid components used can be aromatic or heterocyclic carboxylic acids which possess, although possibly not until after decarboxylation, at least one molecule position capable of coupling. These carboxylic acids can also carry substituents.

The following are preferable as substituents: alkyl, substituted alkyl, alkoxy, carbalkoxy or halogen. In the purely aromatic compounds there must be at least one hydroxyl group to insure ability to couple. In heterocyclic compounds, substitution by hydroxyl groups is generally not necessary. Carboxylic acids capable of coupling or capable after decarboxylation of coupling that are of particular usefulness are ones of the benzene series, the naphthalene series or of heterocyclic compounds. The following may be given as examples: 2-hydroxy-4-chlorobenzoic acid, 2-hydroxy-4,6-dichlorobenzoic acid, γ-resorcylic acid, β-resorcylic acid, phloroglucinol, carboxylic acid, orcinol carboxylic acid, phloroglucinol dicarboxylic acid, 2-hydroxynaphthoic acid-1,3-hydroxy-4-carboxydiphenyl, β-indole carboxylic acid, N-alkyl-β-indole carboxylic acid, 2-methyl-β-indole carboxylic acid, α-thiophen carboxylic acid. The substituted α-pyrrole carboxylic acids have proved particularly satisfactory. Apart from being readily obtainable, particularly in their completely substituted form by means of Knorr's pyrrole synthesis, they possess the property of being very readily decarboxylated to form an azo component that couples very readily even in acid medium.

Aliphatic tertiary and aryl-aliphatic tertiary alcohols may be mentioned as examples of tertiary alcohol components for the esters, e.g., 1,1-dimethylpropyl-carbinol, 1-methyl-1-chlormethyl - propylcarbinol, methyl - diethylcarbinol, 1,1-diethyl-propylcarbinol, methyl-propylbutylcarbinol, methyl-ethylpropyl-carbinol, methyl-dipropylcarbinol 1,1-dimethyl phenylcarbinol.

The decomposition of the thermolabile esters of the tertiary alcohols can be assisted if acid catalysts or catalysts that have acid action in conditions of heat are included in the reproduction coating. The following are examples of suitable cleavage catalysts: organic carboxylic and sulphonic acids, e.g., oxalic acid·$H_2O$, malonic acid, trichloroacetic acid, sulphanilic acid, p-toluene sulphonic acid, m-xylene sulphonic acid; salts that dissolve in water with an acid pH or those which when heated have acid action, e.g., zinc chloride·$6H_2O$, barium chloride·$2H_2O$, calcium chloride·$6H_2O$, manganese-II-sulphate·$4H_2O$, aniline hydrochloride. Also, sulphonic acid esters which have the property of decomposing under the influence of heat into sulphonic acid and olefine or polymers thereof, e.g., p-toluene-sulphonic acid ethyl ester, benzene sulphonic acid benzyl ester, p-toluene sulphonic acid benzyl ester, 2-(p-toluene sulphonyloxy)-propionic acid, are very suitable as cleavage catalysts. Also, enclosure compounds of acids, such as the enclosure compound of hydroquinone and hydrochloric acid, are suitable, as also are mixtures of several components which when heated have an acid reaction as a result of displacement of equilibrium, e.g., in accordance with the following reaction system:

Systems of this sort may for example consist of potassium bisulphate and m-xylene sulphonic acid potassium salt or potassium bisulphate and p-toluene sulphonic acid potassium salt or sodium oxalate and sodium bisulphate. Cleavage catalysts which show a raised acidity as a result of complex formation are also possible; complexes of boric acid with compounds containing hydroxyl groups, e.g., tartaric acid, mannitol, mannose, citric acid and 2,2'-dihydroxydiphenyl may be mentioned. The last named of these groups of cleavage catalysts—particularly the complex of boric acid with 2,2'-dihydroxydiphenyl—has proved to be particularly satisfactory.

In the reproduction coatings in accordance with the invention known diazo compounds are also contained. Although practically all aromatic diazo compounds that are sufficiently stable can be used, certain groups have proved particularly advantageous, e.g., derivatives of p- aminobenzene diazonium chloride or fluoborate, particularly ones in which a hydrogen atom of the p-amino group can be replaced by lower alkyl groups such as methyl, ethyl or propyl groups and in which the other hydrogen atom is replaced by the butyl, phenyl or benzyl group, or in which the nitrogen of the p-amino group forms part of a cyclic ring such as piperidine or morpholine. A further group consists of the diazo compounds of hydroquinone ether of the general formula

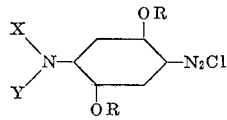

in which R is a lower alkyl, preferably ethyl, or methyl and X is hydrogen, a lower alkyl such as methyl, ethyl or propyl and Y is propyl, benzyl, benzoyl, isopropyl or the [2-dimethyl-aminoacetyl]-benzoyl residue and in which the nitrogen atom of the p-amino group may also be part of a cyclic system such as piperidine or morpholine, as also diazo compounds of hydroquinone dialkyl ether of the following general formula

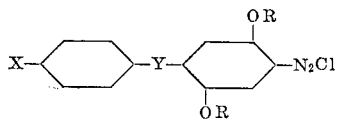

in which X is hydrogen or methyl or a lower alkyl residue, preferably methyl, R is a lower alkyl residue preferably methyl or ethyl, and Y is S or $SO_2$.

For the preparation of the diazotype reproduction material, the two components can be dissolved together in a solvent and applied thus to the support. Suitable supports are constituted by ordinary base papers as used in the diazotype industry, but there are also other possibilities in the form of transparent foils consisting of various materials, e.g., cellulose products, such as cellulose hydrate or cellulose esters, or plastics such as polyamides, polyesters, polycarbonates, polyadducts and polyvinyl compounds. Cellulose products are, however, preferable.

The coating of the material in two separate processes has proved particularly advantageous. In such case the azo component in accordance with the invention, i.e., the thermolabile ester of tertiary alcohol with carboxylic acid, is first applied in solution in organic solvents such as alcohols, e.g., ethyl alcohol, and then the diazo compound in aqueous solution, possibly together with the cleavage catalyst. The procedure is such that in the reproduction coating of the diazotype material there is about 1 to 10 mols—preferably about 2 to 3—of azo compound to one mol of diazo compound and about 0.1 to 10 mols—preferably 1 to 5 mols—of cleavage catalyst to one mol of azo compound.

For the preparation of diazo prints, the material thus obtained is exposed to light behind a master in known manner and is then brought into contact with a hot substance, e.g., a hot roller or heated plate. In this process developing temperatures of 80–180° C., preferably 120–130° C., are used.

The reproduction coatings of the present invention have the advantage of being easily prepared, of being developed merely by the application of heat, i.e., without additional processing, and of possessing a long shelf-life.

Example 1

4 parts by weight of the compound corresponding to Formula 4 and 10 parts by weight of 2,2'-dihydroxydiphenyl are dissolved together in 100 parts by volume of methanol and the solution is coated upon a base paper of the kind commonly used in the diazotype industry and dried in a hot air current. Having been pretreated in this manner the paper is further treated with a solution of 2 parts by weight of the zinc chloride double salt of 1- diazo-2,5-diethoxy-4-benzoyl-amido-benzene, 6 parts by weight of boric acid and 4 parts by weight of the trisodium salt of 1,3,6-naphthalene-trisulphonic acid in 100 parts by volume of water and is dried in a hot air current at about 50° C. The paper thus sensitized is exposed under a master to the light of an 18-amp arc lamp. The copy is then developed by brief contact with heated rollers or plates which are at a temperature of about 120–130° C. In this way a copy corresponding to the master in a blue-violet shade is obtained.

Instead of the compound corresponding to Formula 4, the compound corresponding to Formula 14 or that corresponding to Formula 19 may be used with equally good results.

For the preparation of the compound corresponding to Formula 4, a solution of 93.3 parts by weight of 2,4-dimethyl - 3 - carboxylic acid ethyl ester - 5 - pyrrolecarboxylic acid-tert.-butylester in 600 parts by volume of absolute toluene into which 8.5 parts by weight of sodium wire has been pressed, is heated on a steam bath, with stirring, for 4 hours. The sodium salt of the pyrrole compound then separates out. With further stirring and heating, 27 parts by volume of dimethyl sulphate are introduced dropwise and the reaction mixture is stirred for a further hour. It is then cooled and the precipitated sodium methyl sulphate is filtered off. The toluene is removed from the filtrate by steam distillation. As the distillation residue cools, the 1,2,4 - trimethyl - 3 - carboxylic acid ethyl ester-5-pyrrole carboxylic acid-tert.-butylester separates out in solid form. After being filtered off and recrystallized from a methanol-water mixture, the compound is obtained in the form of colorless needles with a melting point of 120° C. The pyrrole derivative thus obtained is readily soluble in most organic polar solvents, sparingly soluble in petroleum-ether and insoluble in water.

For the preparation of the compound corresponding to Formula 14, 43 parts by weight of acetoacetic acid-tert.-amylester are dissolved in 50 parts by volume of glacial acetic acid. A saturated aqueous solution of 17.2 parts by weight of sodium nitrite is then introduced over a period of 1–2 hours, with stirring, at a temperature of 20° C. The nitrosation solution is allowed to stand for 3 hours and then the reaction mixture is introduced slowly, with thorough stirring, into a solution heated to 60° C. consisting of 29 parts by weight of acetoacetic acid methyl ester in 100 parts by volume of glacial acetic acid in which 15 parts by weight of zinc dust are suspended. Subsequently 50 parts by weight of zinc dust are additionally introduced by degrees in such a way that there is always an excess in the reaction mixture, the temperature being maintained by cooling at about 65° C. For the completion of the reaction, stirring is continued after the introduction of the zinc dust for a further hour at about 70–75° C. The reaction mixture is then poured into 1500 parts by volume of water and allowed to stand overnight. The reaction product is separated by suction filtration and recrystallized from a mixture of methanol and water, the colorless 2,4-dimethyl-3-carboxylic acid methylester-5-pyrrole carboxylic acid-tert.-amylester with a melting point of 94° C. being then obtained. The compound is readily soluble in most organic solvents, sparingly soluble in petroleum-ether and insoluble in water.

For the preparation of the compound corresponding to Formula 19, 43 parts by weight of acetoacetic acid-tert.-amylester are dissolved in 50 parts by volume of glacial acetic acid. The tertiary amyl ester is nitrosated at 20° C. by the addition with stirring over a period of 1–2 hours of a saturated aqueous solution of 17.2 parts by weight of sodium nitrite. The reaction mixture is allowed to stand for three hours and is then introduced slowly with thorough stirring into a solution which has been heated to 60° C. consisting of 25 parts by weight of acetyl acetone in 100 parts by volume of glacial acetic acid in which 15 parts by weight of zinc dust are suspended.

Subsequently, 50 parts by weight of zinc dust are additionally introduced by degrees into the reaction mixture in such a way that there is always an excess of zinc dust in the solution, the reaction mixture being cooled to about 65° C. After the introduction of the zinc dust, stirring is continued for about an hour at 70–75° C. until the reaction is completed. The reaction mixture is then poured into 1500 parts by volume of water. After the mixture has been allowed to stand overnight, the precipitated reaction product is separated by suction filtration and recrystallized from a methanol-water mixture to give the colorless 2,4-dimethyl-3-acetyl-5-pyrrole carboxylic acid-tert.-amylester with a melting point of 83° C. The compound is readily soluble in organic solvents, sparingly soluble in petroleum ether and insoluble in water.

*Example 2*

4 parts by weight of the compound corresponding to Formula 7 and 10 parts by weight of 2,2'-dihydroxy-diphenyl are dissolved in 100 parts by volume of methanol. This solution is applied to a base paper of the kind commonly used in the diazotype industry and is dried in a hot air current. Having been pretreated in this manner the material is then further treated with a solution of 2 parts by weight of the zinc chloride double salt of 1-diazo-3-chloro-4-morpholine benzene and 6 parts by weight of boric acid in 100 parts by volume of water and dried in a hot air current at 50° C. The paper thus sensitized is exposed under a master to the light of an 18-amp arc lamp. For development the material is brought briefly into contact with heated rollers or plates which are at a temperature of 120–130° C. In this way a yellow-brown copy corresponding to the master is obtained.

The compound corresponding to Formula 13 can be used with equally good results instead of the compound corresponding to Formula 7.

For the preparation of the compound corresponding to Formula 7, 39.5 parts by weight of acetoacetic acid-tert.-butylester are dissolved in 50 parts by volume of glacial acetic acid. A saturated aqueous solution of 17.2 parts by weight of sodium nitrite is added thereto, with stirring, at 20° C. over a period of 1–2 hours. The nitrosation solution is allowed to stand for 3 hours and then the reaction mixture is added slowly with thorough stirring to a solution which has been heated to 60° C., consisting of 36 parts by weight of acetoacetic acid-isopropylester in 100 parts by volume of glacial acetic acid in which 15 parts by weight of zinc dust have been suspended. Subsequently, 50 parts by weight of zinc dust are additionally introduced by degrees in such a manner that there is always excess zinc dust in the reaction mixture, the reaction temperature being kept by cooling at 65° C. For the completion of the reaction, stirring is continued for one hour at about 70–75° C. after the introduction of the zinc dust. The reaction mixture is then introduced into 1500 parts by volume of water and allowed to stand overnight. The reaction product is then separated by suction filtration and recrystallized from a methanol-water mixture, the colorless 2,4-dimethyl-3-carboxylic acid isopropylester-5-pyrrole carboxylic acid-tert.-butylester with a melting point of 123° C. being then obtained. The compound is readily soluble in most organic solvents, sparingly soluble in petroleum-ether and insoluble in water.

For the preparation of the compound corresponding to Formula 13, 39.5 parts by weight of acetoacetic acid-tert.-butyl-ester are dissolved in 50 parts by volume of glacial acetic acid. A saturated aqueous solution of 17.2 parts by weight of sodium nitrite is added, with stirring, at 20° C. over a period of 1–2 hours. The nitrosation solution is allowed to stand for 3 hours and the reaction mixture is then introduced, slowly with thorough stirring, into a solution which has been heated to 60° C. consisting of 25 parts by weight of acetyl acetone in 100 parts by volume of glacial acetic acid in which 15 parts by weight of zinc dust are suspended. Subsequently, 50 parts by weight of zinc dust are introduced additionally by degrees in such a manner that there is always an excess of zinc dust in the reaction mixture, the reaction mixture being kept by cooling at 65° C. For the completion of the reaction, stirring is continued for one hour at about 70–75° C. after the addition of the zinc dust. The reaction mixture is then poured into 1500 parts by volume of water and allowed to stand overnight. The reaction product is then separated by suction filtration and recrystallized from a methanol-water mixture, the colorless 2,4-dimethyl-3-acetyl-5-pyrrole-carboxylic acid-tert.-butylester with a melting point of 141° C. being then obtained. The compound is readily soluble in most organic solvents, sparingly soluble in petroleum-ether and insoluble in water.

*Example 3*

4 parts by weight of the compound corresponding to Formula 3 and 10 parts by weight of 2,2'-dihydroxy-diphenyl are dissolved in 100 parts by volume of dioxane. The solution is applied to base paper of the sort commonly used in the diazo-type industry and is dried in a hot air current. Having been pretreated in this way, the material is then treated with a solution of 2 parts by weight of the zinc chloride double salt of 1-diazo-2,5-diethoxy-4-[4'-(dimethylamino-acetamido)-benzoylamido]-benzene and 6 parts by weight of boric acid in 100 parts by volume of water and the material is dried in a hot air current at about 50° C. The paper thus sensitized is exposed under a master to the light of an 18-amp arc lamp. For development, the material is brought into contact briefly with heated rollers or plates which are at a temperature of 120–130° C. In this way a blue-black copy corresponding to the master is obtained.

The preparation of the compound corresponding to Formula 3 is as described by A. Treibs and K. Hintermaier, "Berichte der Deutschen Chemischen Gesellschaft," vol. 87, page 1168 (1954), by the reaction of isonitroso-acetoacetic acid-tert.-butylester with acetoacetic acid ethyl ester. The 2,4-dimethyl-3-carboxylic acid ethyl ester-5-pyrrole-carboxylic acid-tert.-butyl ester is readily soluble in most organic solvents, sparingly soluble in petroleum-ether and insoluble in water.

*Example 4*

4 parts by weight of the compound corresponding to Formula 6 and 10 parts by weight of 2,2'-dihydroxydiphenyl are dissolved in 100 parts by volume of methanol. This solution is applied to a base paper of the sort commonly used in the diazo-type industry and is dried in a hot air current. Pretreated in this way the material is coated with a solution of 2 parts by weight of the zinc chloride double salt of 1-diazo-2,5-dimethoxy-4'-methyl-diphenyl sulphide and 6 parts by weight of boric acid together with 4 parts by weight of the sodium salt of 1,3,6-naphthalene sulphonic acid in 100 parts by volume of water. It is then dried in a hot air current at about 50° C. The paper thus sensitized is exposed under a master to the light of an 18-amp arc lamp. For development, the material is brought into contact with heated rollers or plates which are at a temperature of 120–130° C. A blue-black copy corresponding to the master is thus obtained.

The preparation of the compound corresponding to Formula 6 is by the method of Treibs et al. specified in Example 3, i.e., by the reaction of isonitroso-acetoacetic acid-tert.-butylester with acetone dicarboxylic acid-diethylester. The 2-methylene carboxylic acid ethyl ester-3-carboxylic acid ethyl ester-4-methyl-5-pyrrole carboxylic acid-tert.-butylester is readily soluble in most organic solvents, sparingly soluble in petroleum-ether and insoluble in water.

Example 5

4 parts by weight of the compound corresponding to Formula 11 and 10 parts by weight of 2,2'-dihydroxydiphenyl are dissolved in 100 parts by volume of methanol. This solution is applied to a transparent paper of the type commonly used in the diazotype industry and is dried in a hot air current. Pretreated in this way the material is further treated with a solution of 2 parts by weight of the zinc chloride double salt of 1-diazo-2,5-dimethoxy-4'-methyl-diphenylsulphone, 6 parts by weight of boric acid and 4 parts by weight of the sodium salt of 1,3,6-naphthalene-trisulphonic acid in 100 parts by volume of water and then dried at about 50° C. in a hot air current. The paper thus sensitized is exposed under a master to the light of an 18-amp arc lamp. For development, the material is brought into contact with heated rollers or plates which are at a temperature of 120–130° C. In this way a red-brown copy corresponding to the master is obtained.

For the preparation of the compound corresponding to Formula 11, 39.5 parts by weight of acetoacetic acid-tert.-butylester are dissolved in 50 parts by volume of glacial acetic acid. A saturated aqueous solution of 17.2 parts by weight of sodium nitrite are added thereto with stirring over a period of 1–2 hours at 20° C. The nitrosation solution is allowed to stand for 3 hours and the reaction mixture is then added slowly with thorough stirring to a solution heated to 60° C. consisting of 43 parts by weight of acetoacetic acid-tert.-amylester in 100 parts by volume of glacial acetic acid in which 15 parts by weight of zinc dust are suspended. Subsequently, 50 parts by weight of zinc dust are additionally introduced by degrees in such manner that there is always an excess of zinc dust in the reaction mixture, the reaction temperature being maintained by cooling at about 65° C. For the completion of the reaction, stirring is continued for one hour at about 70–75° C. after the introduction of the zinc dust and the reaction mixture is then poured into 1500 parts by volume of water and allowed to stand overnight. The reaction product is then separated by suction filtration and recrystallized from a methanol-water mixture, the colorless 2,4-dimethyl-3-carboxylic acid-tert.-amylester-5-pyrrole carboxylic acid-tert.-butylester with a melting point of 137° C. being then obtained. The compound is readily soluble in most organic solvents, sparingly soluble in petroleum-ether and insoluble in water.

Example 6

4 parts by weight of the compound corresponding to Formula 17 and 10 parts by weight of 2,2'-dihydroxydiphenyl are dissolved in 100 parts by volume of methanol. This solution is applied to a lacquered paper and is dried in a hot air current. Thus pretreated, the material is further treated with a solution of 2 parts by weight of the zinc chloride double salt of 1-diazo-2,5-diethoxy-4-(N-benzyl, N-propyl)-amino-benzene and 6 parts by weight of boric acid in 100 parts by volume of water and dried in a hot air current at about 50° C. The paper thus sensitized is exposed under a master to the light of an 18-amp arc lamp. For development the material is brought into contact with heated rollers or plates which are at a temperature of 120–130° C. In this way a brown-violet copy corresponding to the master is obtained.

For the preparation of the compound corresponding to Formula 17, 43 parts by weight of acetoacetic acid-tert.-amylester are dissolved in 100 parts by volume of glacial acetic acid. A saturated aqueous solution of 17.2 parts by weight of sodium nitrite are added thereto at 20° C., with stirring, over a period of 1–2 hours. The nitrosation solution is allowed to stand for 3 hours and then the reaction mixture is slowly introduced, with thorough stirring, into a solution heated to 60° C. consisting of 39.5 parts by weight of acetoacetic acid-tert.-butylester in 100 parts by volume of glacial acetic acid in which 15 parts by weight of zinc dust are suspended. Subsequently, 50 parts by weight of zinc dust are additionally introduced by degrees in such a way that there is all the time an excess of zinc dust in the reaction mixture, the reaction temperature being maintained by cooling at 65° C. For the completion of the reaction, stirring is continued at 70–75° C. for one hour after the introduction of the zinc dust and the reaction mixture is then poured into 1500 parts by volume of water. It is allowed to stand overnight. The reaction product is separated by suction filtration and recrystallized from a methanol-water mixture, the colorless 2,4-dimethyl-3-carboxylic acid-tert.-butylester-5-pyrrole carboxylic acid-tert.-amyl-ester with a melting point of 122° C. being then obtained. The compound is readily soluble in most organic solvents, sparingly soluble in petroleum ether and insoluble in water.

Example 7

4 parts by weight of the compound corresponding to Formula 2 are dissolved in 100 parts by volume of methanol. This solution is applied to a base paper of the kind commonly used in the diazotype industry and is dried in a hot air current. The material thus pretreated is further treated with a solution of 2 parts by weight of the zinc chloride double salt of 1-diazo-2,5-diethoxy-4-benzoyl-amido-benzene, 6 parts by weight of boric acid and 10 parts by weight of citric acid in 100 parts by volume of water and is then dried at about 50° C. in a hot air current. The paper thus sensitized is exposed under a master to the light of an 18-amp arc lamp. For development, the material is brought briefly into contact with heated rollers or plates which are at a temperature of 120–130° C. A blue-violet copy corresponding to the master is obtained.

For the preparation of the compound corresponding to Formula 2, a solution of 67.2 parts by weight of 2,4-dimethyl-3-carboxylic acid methylester-5-pyrrole carboxylic acid-tert.-butylester in 600 parts by volume of absolute toluene into which 8.5 parts by weight of sodium wire have been pressed is heated with stirring, for four hours on a steam bath. The sodium salt of the pyrrole compound thereupon separates out. With further stirring and heating, 27 parts by volume of dimethyl sulphate are introduced dropwise and the reaction mixture is further stirred for one hour. It is then cooled, the precipitated sodium methyl sulphate is filtered off and the toluene is removed from the filtrate by steam distillation. As the distillation residue cools, the 1,2,4-trimethyl-3-carboxylic acid methylester-5-pyrrole carboxylic acid-tert.-butylester separates out in solid form. After filtration followed by recrystallization from a mixture of methanol and water, the compound is obtained in the form of colorless needles with a melting point of 98° C. The pyrrole derivative thus obtained is readily soluble in most organic solvents, sparingly soluble in petroleum-ether and insoluble in water.

Example 8

4 parts by weight of the compound corresponding to Formula 15 are dissolved in 100 parts by volume of methanol. This solution is applied to a base paper of the type commonly used in the diazotype industry and it is dried in a hot air current. The material thus pretreated is further treated with a solution of 2 parts by weight of 4 - [N - (2,6-dichlorobenzyl)-amino]-benzene-diazonium chloride, 6 parts by weight of boric acid and 10 parts by weight of citric acid in 100 parts by volume of water and then dried at about 50° C. in a hot air current. The paper thus sensitized is exposed under a master to the light of an 18-amp arc lamp. For development the material is brought briefly into contact with heated rollers or plates which are at a temperature of 120–130° C. In this way a deep blue copy corresponding to the master is obtained.

For the preparation of the compound corresponding to Formula 15, 52 parts by weight of acetoacetic acid-tert.-amyl ester are dissolved in 60 parts by volume of glacial acetic acid. A saturated aqueous solution of 20.7 parts by weight of sodium nitrite are added thereto at 20° C., with stirring, over a period of 1–2 hours. The nitrosation solution is allowed to stand for 3 hours and the reaction mixture is then slowly introduced, with thorough stirring, into a solution heated to 60° C. consisting of 39 parts by weight of acetoacetic acid-ethyl ester in 100 parts by volume of glacial acetic acid in which 15 parts by weight of zinc dust are suspended. Subsequently 60 parts by weight of zinc dust are additionaly introduced by degrees in such a way that all the time there is an excess of zinc dust in the reaction mixture, the reaction temperature being maintained by cooling at 65° C. For the completion of the reaction, stirring is continued at 70–75° C. for one hour after the addition of the zinc dust and the reaction mixture is then poured into 2000 parts by volume of water and allowed to stand overnight. The reaction product is separated by suction-filtration and recrystallized from a mixture of methanol and water, the colorless 2,4-dimethyl-3-carboxylic acid ethylester-5-pyrrole carboxylic acid-tert.-amyl ester with a melting point of 93° C. being then obtained. The compound is readily soluble in most organic solvents, sparingly soluble in petroleum-ether and insoluble in water.

*Example 9*

4 parts by weight of the compound corresponding to Formula 10 are dissolved in 100 parts by volume of ethanol. This solution is applied to a base paper of the kind commonly used in the diazotype industry and is dried in a hot air current. Thus pretreated, the material is further treated with a solution of 2 parts by weight of 4-[N-(2,6-dichloro-benzyl)-amino]-benzene diazonium chloride and 10 parts by weight of oxalic acid in 100 parts by volume of water and is then dried at about 50° C. in a hot air current. The paper thus sensitized is exposed under a master to the light of an 18-amp arc lamp. For development, the material is brought briefly into contact with heated rollers or plates which are at a temperature of 120–130° C. In this way a blue copy corresponding to the master is obtained.

For the preparation of the compound corresponding to Formula 10, 39.5 parts by weight of acetoacetic acid-tert.-butylester are dissolved in 50 parts by volume of glacial acetic acid. A saturated aqueous solution of 17.2 parts by weight of sodium nitrite are added thereto at 20° C., with stirring, over a period of 1–2 hours. The nitrosation solution is allowed to stand for 3 hours and then the reaction mixture is introduced slowly, with thorough stirring, into a solution heated to 60° C. consisting of 43 parts by weight of acetoacetic acid-iso-amyl ester in 100 parts by volume of glacial acetic acid in which 15 parts by weight of zinc dust are suspended. Subsequently, 50 parts by weight of zinc dust are additionally introduced by degrees in such a way that there is always an excess of zinc dust in the reaction mixture, the reaction temperature being maintained by cooling at 65° C. For the completion of the reaction, stirring is continued for one hour at about 70–75° C. after the addition of the zinc dust. The reaction mixture is then poured into 1500 parts by volume of water and allowed to stand overnight. The reaction product is separated by suction filtration and recrystallized from a mixture of methanol and water, the colorless 2,4-dimethyl-3-carboxylic acid isoamylester-5-pyrrole carboxylic acid-tert.-butylester with a melting point of 140° C. being then obtained. The compound is readily soluble in most organic solvents, sparingly soluble in petroleum-ether and insoluble in water.

*Example 10*

4 parts by weight of the compound corresponding to Formula 12 are dissolved in 100 parts by volume of methanol. This solution is applied to a base paper of the kind commonly used in the diazotype industry and is dried in a hot air current. Thus pretreated the material is further treated with a solution of 2 parts by weight of 4-(N-benzyl, N-ethyl)-amino-benzene-diazonium-hydrosulphate and 10 parts by weight of oxalic acid in 100 parts by volume of water and then dried at about 50° C. in a hot air current. The paper thus sensitized is exposed under a master to the light of an 18-amp arc lamp. For development the material is brought into contact briefly with heated rollers or plates which are at a temperature of 120–130° C. A blue copy corresponding to the master is obtained.

For the preparation of the compound corresponding to Formula 12, 39.5 parts by weight of acetoacetic acid-tert.-butylester are dissolved in 50 parts by volume of glacial acetic acid. A saturated aqueous solution of 17.2 parts by weight of sodium nitrite is introduced at 20° C. with stirring over a period of 1–2 hours. The nitrosation solution is allowed to stand for 3 hours and the reaction mixture is then introduced slowly, with thorough stirring, into a solution heated to 60° C. of 48 parts by weight of acetoacetic acid benzylester in 100 parts by volume of glacial acetic acid in which 15 parts by weight of zinc dust are suspended. Subsequently, 50 parts by weight of zinc dust are additionally introduced by degrees in such manner that there is always excess zinc dust in the reaction mixture, the reaction temperature being maintained by cooling at 65° C. For the completion of the reaction, stirring is continued for one hour at 70–75° C. after the introduction of the zinc dust. The reaction mixture is then poured into 1500 parts by volume of water and allowed to stand overnight. The reaction product is separated by suction filtration and recrystallized from a mixture of methanol and water, the colorless 2,4-dimethyl-3-carboxylic acid benzylester-5-pyrrole carboxylic acid-tert.-butylester with a melting point of 119° C. being then obtained. The compound is readily soluble in most organic solvents, sparingly soluble in petroleum ether and insoluble in water.

*Example 11*

4 parts by weight of the compound corresponding to Formula 18 are dissolved in 100 parts by volume of dioxane. This solution is applied to a base paper of the kind commonly used in the diazotype industry and it is dried in a hot air current. Having been pretreated in this way, the material is then further treated with a solution of 2 parts by weight of the zinc chloride double salt of 1-diazo-2,5-diethoxy-4'-methyl-diphenyl-sulphone and 10 parts by weight of oxalic acid in 100 parts by volume of water and then dried at about 50° C. in a hot air current. The paper thus sensitised is exposed under a master to the light of an 18-amp arc lamp. For development the material is brought into contact briefly with heated rollers or plates which are at a temperature of 120–130° C. In this way a red-brown copy corresponding to the master is obtained.

For the preparation of the compound corresponding to Formula 18, 43 parts by weight of acetoacetic acid-tert.-amyl ester are dissolved in 50 parts by volume of glacial acetic acid. A saturated aqueous solution of 17.2 parts by weight of sodium nitrite is added slowly thereto at 20° C., with stirring, over a period of 1–2 hours. The nitrosation solution is allowed to stand for 3 hours and the reaction mixture is then introduced slowly, with thorough stirring, into a solution heated to 60° C. consisting of 48 parts by weight of acetoacetic acid benzyl ester in 100 parts by volume of glacial acetic acid in which 15 parts by weight of zinc dust are suspended. Subsequently, 50 parts by weight of zinc dust are additionally introduced by degrees in such a way that there is always an excess of zinc dust in the reaction mixture, the reaction temperature being maintained by cooling at 65° C. For the completion of the reaction, stirring is continued for one hour at about 70–75° C. after the introduction of the zinc dust and then the reaction mixture is poured into 1500 parts by volume of water and allowed to stand overnight. The reaction product is separated by suction filtration and recrystallised from a mixture of methanol and water, the colourless 2,4-dimethyl-3-carboxylic acid benzylester-5-pyrrole carboxylic acid-tert.-amylester with a melting point of 74° C. being then obtained. The compound is readily soluble in most organic solvents, sparingly soluble in petroleum-ether and insoluble in water.

*Example 12*

4 parts by weight of the compound corresponding to Formula 5 are dissolved in 100 parts by volume of methanol. This solution is applied to a base paper of the kind commonly used in the diazotype industry and it is dried in a hot air current. Having been pretreated in this way the material is further treated with a solution of 2 parts by weight of the zinc chloride double salt of 1-diazo-2,5-diethoxy - 4 - [4' - (dimethylamino-acetamido)-benzoylamido]-benzene and 10 parts by weight of 1,3-dimethyl-4-benzene sulphonic acid in 100 parts by volume of water and is then dried at about 50° C. in a hot air current. The paper thus sensitized is exposed under a master to the light of an 18-amp arc lamp. For development the material is brought into contact briefly with heated rollers or plates which are at a temperature of 120–130° C. A blue-black copy corresponding to the master is thus obtained.

The preparation of the compound corresponding to Formula 5 is by the method of Treibs et al. detailed in Example 3, i.e., by the reaction of isonitroso-acetoacetic acid-tert.-butylester with propionylacetic acid-ethyl ester. The 2-ethyl-3-carboxylic acid ethylester-4-methyl-5-pyrrole carboxylic acid-tert.-butylester is likewise readily soluble in most organic solvents, sparingly soluble in petroleum-ether and insoluble in water.

*Example 13*

4 parts by weight of the compound corresponding to Formula 8 are dissolved in 100 parts by volume of dioxane. This solution is applied to a base paper of the kind commonly used in the diazotype industry and it is dried in a hot air current. Having been pretreated in this manner, the material is further treated with a solution of 2 parts by weight of 4-diazo-diphenylamine-hydrosulphate and 10 parts by weight of 1,3-dimethyl-4-benzene sulphonic acid in 100 parts by volume of water and then dried at about 50° C. in a hot air current. Thus sensitized, the paper is exposed under a master to the light of an 18-amp arc lamp. For the development the material is brought into contact briefly with heated rollers or plates which are at a temperature of 120–130° C. In this way a light-blue copy corresponding to the master is obtained.

For the preparation of the compound corresponding to Formula 8, 39.5 parts by weight of acetoacetic acid-tert.-butylester are dissolved in 50 parts by volume of glacial acetic acid. A saturated aqueous solution of 17.2 parts by weight of sodium nitrite are added thereto at 20° C., with stirring, over a period of 1–2 hours. The nitrosation solution is allowed to stand for 3 hours and the reaction mixture is then introduced slowly with thorough stirring into a solution heated to 60° C. of 39.5 parts by weight of acetoacetic acid-n-butylester in 100 parts by volume of glacial acetic acid in which 15 parts by weight of zinc dust are suspended. Subsequently, 50 parts by weight of zinc dust are additionally introduced by degrees in such manner that there is always an excess of zinc dust in the reaction mixture, the reaction temperature being maintained by cooling at 65° C. For the completion of the reaction, stirring is continued for one hour at about 70–75° C. after the introduction of the zinc dust and the reaction mixture is then poured into 1500 parts by volume of water and allowed to stand overnight. The reaction product is separated by suction filtration and recrystallised from a mixture of methanol and water, the colourless 2,4-dimethyl-3-carboxylic acid n-butylester 5-pyrrole carboxylic acid-tert.-butylester with a melting point of 117° C. being then obtained. The compound is readily soluble in most organic solvents, sparingly soluble in petroleum-ether and insoluble in water.

*Example 14*

4 parts by weight of the compound corresponding to Formula 9 are dissolved in 100 parts by volume of methanol. This solution is applied to a base paper of the kind commonly used in the diazotype industry and it is then dried in a hot air current. Having been pretreated in this manner the material is further treated with a solution of 2 parts by weight of the zinc chloride double salt of 1-diazo-2,5-diethoxy-4-benzoylamidobenzene and 10 parts by weight of 1,3-dimethyl-4-benzene sulphonic acid in 100 parts by volume of water and then dried at about 50° C. in a hot air current. The paper thus sensitised is exposed under a master to the light of an 18-amp arc lamp. For development the material is brought into contact briefly with heated rollers or plates which are at a temperature of 120–130° C. A blue-violet copy corresponding to the master is obtained.

For the preparation of the compound corresponding to Formula 9, 39.5 parts by weight of acetoacetic acid-tert.-butylester are dissolved in 50 parts by volume of glacial acetic acid. A saturated aqueous solution of 17.2 parts by weight of sodium nitrite are added thereto at 20° C. with stirring over a period of 1–2 hours. The nitrosation solution is allowed to stand for 3 hours and the reaction mixture is then introduced slowly with thorough stirring into a solution heated to 60° C. consisting of 39.5 parts by weight of acetoacetic acid-tert.-butylester in 100 parts by volume of glacial acetic acid in which 15 parts by weight of zinc dust are suspended. Subsequently, 50 parts by weight of zinc dust are introduced additionally by degrees in such manner that there is always an excess of zinc in the reaction mixture, the reaction temperature being maintained by cooling at 65° C. For the completion of the reation stirring is continued at about 70–75° C. for 1–2 hours after the introduction of the zinc dust and the reaction mixture is then poured into 1500 parts by volume of water and allowed to stand over-night. The reaction mixture is separated by suction filtration and recrystallized from a mixture of methanol and water, the colourless 2,4-dimethyl-3,5-dicarboxylic acid tert. butylester pyrrole with a melting point of 153° C. being then obtained. The compound is readily soluble in most organic solvents, sparingly soluble in petroleum-ether and insoluble in water.

*Example 15*

4 parts by weight of the compound corresponding to Formula 16 are dissolved in 100 parts by volume of methanol. The solution is applied to a base paper of the kind commonly used in the diazotype industry and is dried in a hot air current. Having been thus pretreated, the material is further treated with a solution of 2 parts by weight of the zinc chloride double salt of 1-diazo-2,5-dimethoxy-4'-methyl-diphenyl sulphide and 10 parts by weight of 1,3-dimethyl-4-benzene sulphonic acid in 100 parts by volume of water and then dried at about 50° C. in a hot air current. The paper thus sensitised is exposed under a master to the light of an 18-amp arc lamp. For development the material is brought into contact briefly with heated rollers or plates which are at a temperature of 120–130° C. In this way a blue-violet copy corresponding to the master is obtained.

For the preparation of the compound corresponding to Formula 16, 43 parts by weight of acetoacetic acid-tert.-amylester are dissolved in 50 parts by volume of glacial acetic acid. A saturated aqueous solution of 17.2 parts by weight of sodium nitrite are added thereto at 20° C., with stirring, over a period of 1–2 hours. The nitrosation solution is allowed to stand for 3 hours and then the reaction mixture is introduced slowly, with thorough stirring, into a solution heated to 60° C. consisting of 36 parts by weight of acetoacetic acid-iso-propylester in 100 parts by volume of glacial acetic acid in which 15 parts by weight of zinc dust are suspended. Subsequently, 50 parts by weight of zinc dust are additionally introduced by degrees in such manner that there is always an excess of zinc dust in the reaction mixture, the reaction temperature being maintained by cooling at 65° C. For the completion of the reaction stirring is continued for one hour at about 70–75° C. after the introduction of the zinc dust and the reaction mixture is then poured into 1500 parts by volume of water and allowed to stand overnight. The reaction product is separated by suction filtration and recrystallized from a mixture of methanol and water, the nearly colourless 2,4-dimethyl-3-carboxylic acid isopropylester-5-pyrrole carboxylic acid-tert.-amylester with a melting point of 56° being then obtained. The compound is readily soluble in most organic solvents, sparingly soluble in petroleum-ether and insoluble in water.

*Example 16*

2.5 parts by weight of the compound corresponding to Formula 1, 2.5 parts by weight of 1-diazo-2,5-diethoxy-4-benzoylamido-benzene and 10 parts by weight of zinc chloride are dissolved in 100 parts by volume of a mixture of ethanol and dioxane (4:1). This solution is applied to a roughened foil made of polyethylene-terephthalate and it is dried at about 50° C. in a hot air current. The material thus sensitised is exposed under a master to the light of an 18-amp arc lamp. For development the material is brought into contact briefly with heated rollers or plates which are at a temperature of 110–120° C. In this way a blue-violet copy corresponding to the master is obtained.

For the preparation of the compound corresponding to Formula 1, 158 parts by weight of acetoacetic acid-tert.-butylester are dissolved in 200 parts by volume of glacial acetic acid. A saturated aqueous solution of 69 parts by weight of sodium nitrite is added thereto at 20° C. with stirring, over a period of 1–2 hours. The nitrosation solution is allowed to stand for 3 hours and then the reaction mixture is introduced slowly, with thorough stirring into a solution heated to 60° C. of 116 parts by weight of acetoacetic acid methylester in 400 parts by volume of glacial acetic acid in which 50 parts by weight of zinc dust are suspended. Subsequently, 200 parts by weight of zinc dust are additionally introduced by degrees in such manner that there is always an excess of zinc dust in the reaction mixture, the reaction temperature being maintained by cooling at 65° C. For the completion of the reaction, stirring is continued for one hour at about 70–75° C. after the introduction of the zinc dust and the reaction mixture is then poured into 5000 parts by volume of water and allowed to stand overnight. The reaction product is separated by suction filtration and recrystallized from a mixture of methanol and water, the 2,4-dimethyl-3-carboxylic acid methylester-5-pyrrole-carboxylic-acid-tert.-butylester with a melting point of 141° C. being then obtained. The compound is readily soluble in most organic solvents, sparingly soluble in petroleum-ether and insoluble in water.

In the above description the parts by weight are measured in grams and the parts by volume are measured in milliliters for example to obtain proper proportions.

It will thus be seen that applicant has obtained a heat developable diazo material which has a long shelf life and only requires heat for development after exposure through the master.

The following structural formulas identified by number correspond to those referred to above.

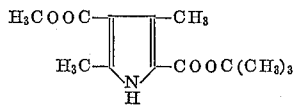

Formula 1

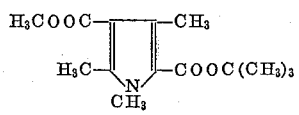

Formula 2

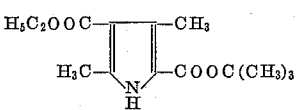

Formula 3

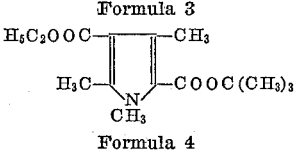

Formula 4

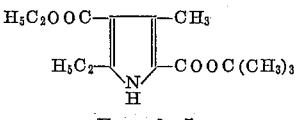

Formula 5

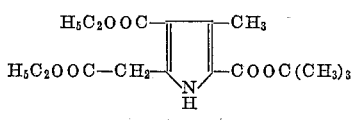

Formula 6

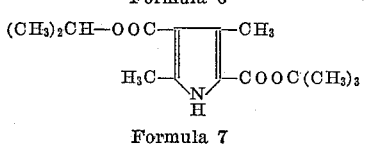

Formula 7

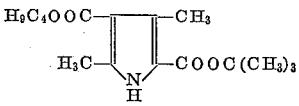

Formula 8

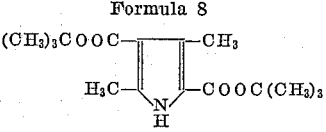

Formula 9

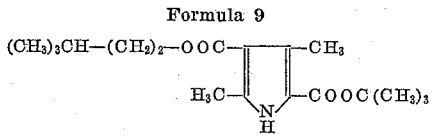

Formula 10

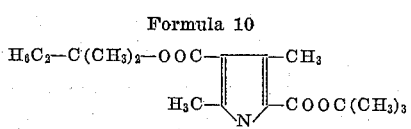

Formula 11

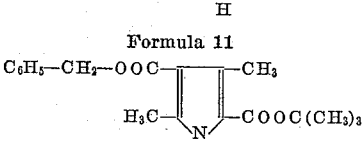

Formula 12

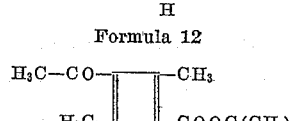

Formula 13

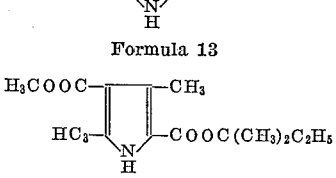

Formula 14

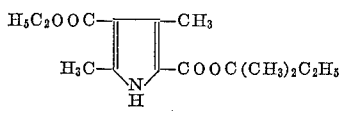

Formula 15

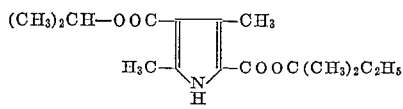

Formula 16

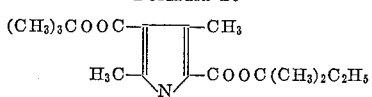

Formula 17

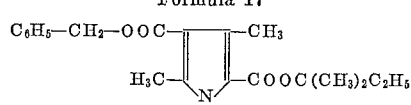

Formula 18

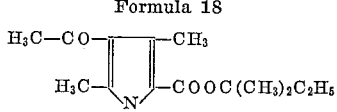

Formula 19

It will be apparent that various changes may be made within the spirit of the invention as defined by the valid interpretation of the claims.

What is claimed is:

1. A heat developable diazo type material comprising a base and a coating on said base said coating comprising a diazonium compound and a thermolabile pyrrole compound having a carboxylic acid tertiary alkyl ester group which pyrrole compound upon heating decomposes to form a coupler to transform the diazo compound to an azo dyestuff.

2. The invention according to claim 1 in which the carboxylic acid tertiary alkyl ester group is in the alpha position of the pyrrole compound.

3. The invention according to claim 1 in which the tertiary alkyl group includes a total of not over 6 carbon atoms.

4. A coating combination for heat-developable diazotype materials comprising a diazonium compound and a thermolabile pyrrole compound having a carboxylic acid tertiary alkyl ester group, which pyrrole compound upon heating decomposes to form a coupler compound; said combination being heat developable at temperatures of 80° C. to 180° C.

5. The combination of claim 4 in which said pyrrole compound has its ester group in the alpha position.

6. The combination of claim 4 which includes a catalyst from the group consisting of acids and compounds that become acid under the influence of heat.

7. A combination in accordance with claim 4 in which said compound has the general formula

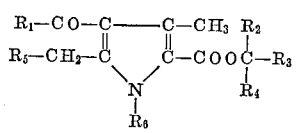

where
 $R_1$ is selected from the group consisting of: methoxy; ethoxy; isopropoxy; butoxy; t-butoxy; 3-methyl-butoxy; 1,1-dimethyl-propoxy; benzyloxy; and methyl,
 $R_2$, $R_3$ and $R_4$ are selected from the group consisting of methyl and ethyl,
 $R_5$ is selected from the group consisting of hydrogen, methyl, and ethoxycarbonyl, and
 $R_6$ is selected from the group consisting of hydrogen and methyl.

8. The heat developable diazotype material comprising a cellulose base, a thermolabile pyrrole compound layer coated on said base, and a diazonium compound layer coated over said pyrrole compound layer on said base, said pyrrole compound having a carboxylic acid tertiary alkyl ester group and decomposes upon heating to form a coupler, said material being heat-developable after exposure between 80° C. and 180° C.

9. A material in accordance with claim 8 in which said pyrrole compound has the general formula

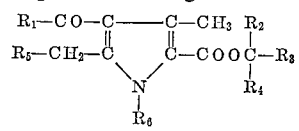

where $R_1$ is selected from the group consisting of: methoxy; ethoxy; isopropoxy; butoxy; t-butoxy; 3-methyl-butoxy; 1,1-dimethyl-propoxy; benzyloxy; and methyl, $R_2$, $R_3$ and $R_4$ are selected from the group consisting of methyl and ethyl, $R_5$ is selected from the group consisting of hydrogen, methyl and ethoxycarbonyl, and $R_6$ is selected from the group consisting of hydrogen and methyl.

10. A material in accordance with claim 8 in which said pyrrole compound is 2,4-dimethyl-3-ethoxycarbonyl-5-t-butoxycarbonyl-pyrrole and said diazonium compound is 2,5-diethoxy-4-[4'-(dimethylamino-acetamido)-benzoyl amido]-benzene diazonium chloride, zinc chloride double salt.

11. The material of claim 8 in which said pyrrole compound layer includes a catalyst selected from the group consisting of acids and compounds that become acid under the influence of heat.

12. A heat-developable diazotype material in accordance with claim 1 in which said diazonium compound is 2,5-diethoxy-4-benzoyl-amido-benzene diazonium chloride and said pyrrole compound is 2,4-dimethyl-3-methoxycarbonyl-5-t-butoxycarbonyl-pyrrole.

References Cited in the file of this patent

UNITED STATES PATENTS

| 2,117,349 | Neher | May 17, 1938 |
| 2,419,296 | Solomon | Apr. 22, 1947 |
| 2,429,249 | Von Glahn et al. | Oct. 21, 1947 |
| 2,552,355 | Von Glahn et al. | May 8, 1951 |
| 2,661,331 | Howard | Dec. 1, 1953 |
| 2,709,655 | Frederick | May 31, 1955 |
| 2,732,299 | Morrison | Jan. 24, 1956 |
| 2,974,042 | Sus et al. | Mar. 7, 1961 |

FOREIGN PATENTS

| 255,007 | Great Britain | July 4, 1951 |

OTHER REFERENCES

Conant and Blatt: The Chemistry of Organic Compounds, 4th Edition, Macmillan, New York, 1952, pp. 590–591.